US010522190B2

(12) United States Patent
Reynolds et al.

(10) Patent No.: US 10,522,190 B2
(45) Date of Patent: Dec. 31, 2019

(54) METHODS AND APPARATUS FOR ORDERED SERIAL SYNCHRONIZATION OF MULTIMEDIA STREAMS UPON SENSOR CHANGES

(71) Applicant: Echo360, Inc., Reston, VA (US)

(72) Inventors: Mark Reynolds, Silver Spring, MD (US); Shaun Procter, Bunbury (AU); Andrew Cramer, Centreville, VA (US); Martin Chudik, Acton, MA (US)

(73) Assignee: Echo360, Inc., Reston, VA (US)

( * ) Notice: Subject to any disclaimer, the term of this patent is extended or adjusted under 35 U.S.C. 154(b) by 0 days.

(21) Appl. No.: 15/975,103

(22) Filed: May 9, 2018

(65) Prior Publication Data

US 2018/0330760 A1 Nov. 15, 2018

Related U.S. Application Data

(60) Provisional application No. 62/503,428, filed on May 9, 2017.

(51) Int. Cl.
*H04N 5/77* (2006.01)
*G11B 27/34* (2006.01)
*G11B 27/30* (2006.01)
*H04N 9/804* (2006.01)

(52) U.S. Cl.
CPC .......... *G11B 27/34* (2013.01); *G11B 27/3036* (2013.01); *G11B 27/3081* (2013.01); *H04N 5/77* (2013.01); *H04N 5/772* (2013.01); *H04N 9/8042* (2013.01)

(58) Field of Classification Search
None
See application file for complete search history.

(56) References Cited

U.S. PATENT DOCUMENTS

| | | | |
|---|---|---|---|
| 2001/0036355 A1* | 11/2001 | Kelly | G11B 27/034 386/290 |
| 2006/0140280 A1 | 6/2006 | Okada et al. | |
| 2008/0088737 A1 | 4/2008 | Sullivan | |
| 2009/0282452 A1 | 11/2009 | Wei | |

(Continued)

OTHER PUBLICATIONS

Huynh "Mapping Streaming Applications onto GPU Systems" (Year: 2014).*

(Continued)

*Primary Examiner* — Eileen M Adams
(74) *Attorney, Agent, or Firm* — Cooley LLP

(57) ABSTRACT

An apparatus includes a processor with first and second input ports and a memory operably coupled to the processor. The processor can detect streams of media samples at the input ports and determine, in response to the detection of the streams of media samples, a capture start time. The processor can also capture a first frame of a first stream of media samples beginning at the capture start time, and a first frame of a second stream of media samples beginning at a first time subsequent to the capture start time. The processor can also calculate a relative offset time based on the capture start time, the first time, and a rate associated with the second stream of media samples, and store, in the memory, an indication of an association between the captured first frame of the second stream of media samples and the relative offset time.

18 Claims, 5 Drawing Sheets

(56) References Cited

U.S. PATENT DOCUMENTS

| | | | |
|---|---|---|---|
| 2010/0254455 A1* | 10/2010 | Matsunaga | G11B 27/10 375/240.12 |
| 2012/0092443 A1* | 4/2012 | Mauchly | H04N 7/15 348/14.12 |
| 2013/0271620 A1 | 10/2013 | Allen et al. | |
| 2014/0059166 A1* | 2/2014 | Mann | H04L 65/60 709/217 |
| 2015/0201254 A1* | 7/2015 | Labrozzi | H04N 21/23435 375/240.02 |
| 2016/0037214 A1 | 2/2016 | Smith et al. | |
| 2016/0269761 A1* | 9/2016 | Ryan | H04N 21/23424 |
| 2018/0227502 A1* | 8/2018 | Menachem | H04N 5/23258 |

OTHER PUBLICATIONS

Blum, Christian. "Synchronization of live continuous media streams." In: Proceedings of the 4th Open Workshop on High Speed Networks. Sep. 1994 (Sep. 1994).

International Search Report dated Jul. 24, 2018 for PCT Application No. PCT/US2018/031814 filed May 9, 2018. 3 pages.

Written Opinion dated Jul. 24, 2018 for PCT Application No. PCT/US2018/031814 filed May 9, 2018. 13 pages.

\* cited by examiner

METHODS AND APPARATUS FOR ORDERED SERIAL SYNCHRONIZATION OF MULTIMEDIA STREAMS UPON SENSOR CHANGES

CROSS-REFERENCE TO RELATED APPLICATIONS

This application claims priority to and the benefit of U.S. Provisional Patent Application No. 62/503,428, filed May 9, 2017 and titled "Methods and Apparatus for Ordered Serial Synchronization of Multimedia Streams Upon Sensor Changes," the entire contents of which are incorporated herein by reference in their entirety.

FIELD

The disclosure herein describes methods and apparatus for implementing a process that is executed upon a startup or a restart of a capture device, to capture media streams arriving at the capture device.

BACKGROUND

The ability to capture live media recordings of, for example, classroom instruction and meetings for on-demand availability and time-shifted viewing has become valuable to institutions such as universities and businesses.

SUMMARY

In some embodiments, an apparatus includes a processor having a first input port and a second input port, and a memory operably coupled to the processor. The processor is configured to detect a first stream of media samples at the first input port and a second stream of media samples at the second input port. The processor is also configured to determine, in response to the detection of the first stream of media samples and the second stream of media samples, a capture start time associated with the first stream of media samples. The processor is also configured to capture, beginning at the capture start time, a first frame of the first stream of media samples. The processor is also configured to capture, beginning at a first time subsequent to the capture start time, a first frame of the second stream of media samples. The processor is also configured to calculate a relative offset time based on the capture start time, the first time, and a rate associated with the second stream of media samples. The processor is also configured to store, in the memory, an indication of an association between the captured first frame of the second stream of media samples and the relative offset time.

In some embodiments, the processor is also configured to combine the captured first frame of the first stream of media samples and the captured first frame of the second stream of media samples, based on the relative offset time, to form a synchronized media file, and transmit the synchronized media file to a remote compute device.

In some embodiments, the processor is also configured to receive an indication of the capture start time from a control server in operable communication with the processor.

In some embodiments, the processor is also configured to receive an indication of the capture start time from a local scheduler.

In some embodiments, the relative offset time is a first relative offset time, and the processor is also configured to detect a third stream of media samples at a third input port of the processor, and to capture a first frame of the third stream of media samples beginning at a second time subsequent to the first time. In some such embodiments, the processor is also configured to calculate a second relative offset time based on the capture start time, the second time, and a rate associated with the third stream of media samples, and to store, in the memory, an indication of an association between the captured first frame of the third stream of media samples and the second relative offset time.

In some embodiments, the processor is also configured to combine the captured first frame of the first stream of media samples, the captured second frame of the second stream of media samples, and the captured third frame of the second stream of media samples to form a synchronized media file, and to transmit the synchronized media file to a remote compute device.

In some embodiments, the processor is also configured to capture a plurality of additional frames of the first stream of media samples and a plurality of additional frames of the second stream of media samples. In some such embodiments, the processor is also configured to combine the captured first frame of the first stream of media samples, the captured second frame of the second stream of media samples, the plurality of additional frames of the first stream of media samples, and the plurality of additional frames of the second stream of media samples, based on the relative offset time, to form a synchronized media file, and to transmit the synchronized media file to a remote compute device.

In some embodiments, the processor is also configured to identify the first time based on a hardware timestamp encoded by the second stream of media samples.

In some embodiments, a method includes detecting: (1) a rate of a first stream of media samples at a first input port of a processor, (2) a rate of a second stream of media samples at a second input port of the processor, and (3) a rate of a third stream of media samples at a third input port of the processor. A capture period is initiated, the capture period having a capture start time based on the first stream of media samples. During the capture period, a first frame of the first stream of media samples is captured, beginning at the capture start time and based on the rate of the first stream of media samples being higher than the rate of the second stream of media samples and the rate of the third stream of media samples. Also during the capture period, a first frame of the second stream of media samples is captured, beginning at a first time subsequent to the capture start time and based on the rate of the second stream of media samples being higher than the rate of the third stream of media samples. Also during the capture period, a first frame of the third stream of media samples is captured, beginning at a second time subsequent to the first time. Also during the capture period, a relative offset time of the captured first frame of the second stream of media samples and a relative offset time of the captured first frame of the third stream of media samples are calculated. The method also includes combining the captured first frame of the first stream of media samples, the captured first frame of the second stream of media samples, and the captured first frame of the third stream of media samples, based on the relative offset time of the captured first frame of the second stream of media samples and the relative offset time of the captured first frame of the third stream of media samples, to form a synchronized, streamable media file.

In some embodiments, the first stream of media samples includes a plurality of sequenced audio samples, the second stream of media samples includes a plurality of sequenced video frames, and the third stream of media samples includes a plurality of sequenced desktop frames.

In some embodiments, the synchronized, streamable media file is a first synchronized, streamable media file, and the method also includes detecting and capturing a fourth stream of media samples received at the processor via a fourth input port, and generating a second synchronized, streamable media file that includes the fourth stream of media samples.

In some embodiments, initiating the capture period is in response to a communication received from a local scheduler or from a control server.

In some embodiments, the method also includes storing, in the memory: an indication of an association between the captured first frame of the second stream of media samples and the relative offset time of the captured first frame of the second stream of media samples, and an indication of an association between the captured first frame of the third stream of media samples and the relative offset time of the captured first frame of the third stream of media samples.

In some embodiments, a non-transitory processor-readable medium stores code representing instructions to be executed by a processor. The code includes code to cause the processor to combine a first captured portion of a first stream of media samples, a first captured portion of a second stream of media samples, and a first captured portion of a third stream of media samples, based on (1) a first relative offset time associated with the second stream of media samples, and (2) a second relative offset time associated with the third stream of media samples, to form a first synchronized, streamable media file. The code also includes code to cause the processor to detect an interruption of the second stream of media samples, and to capture, in response to detecting the interruption, a second captured portion of the first stream of media samples, and a second captured portion of the third stream of media samples. The code also includes code to cause the processor to calculate, in response to detecting the interruption, a revised relative offset time for the third stream of media samples, and to generate a second synchronized, streamable media file based on the revised relative offset time.

In some embodiments, the code also includes code to cause the processor to receive an instruction to initiate a capture period, and to capture, in response to the instruction and beginning at a capture start time, the first captured portion of the first stream of media samples via a first input port of the processor. In some such embodiments, the code also includes code to cause the processor to capture the first captured portion of the second stream of media samples via a second input port of the processor beginning at a first time subsequent to the capture start time, and to capture the first captured portion of the third stream of media samples via a third input port of the processor beginning at a second time subsequent to the first time. The code can also include code to cause the processor to calculate, via the processor, the first relative offset time and the second relative offset time, and to store, in a memory, a representation of the first relative offset time and a representation of the second relative offset time. The instruction to initiate the capture period can be received from one of a local scheduler or a control server.

In some embodiments, the code also includes code to cause the processor to detect and capture a fourth stream of media samples received at the processor via an input port of the processor, and generate a third synchronized, streamable media file that includes the fourth stream of media samples.

In some embodiments, a frame rate of the first stream of media samples is higher than a frame rate of the second stream of media samples, and the frame rate of the second stream of media samples is higher than a frame rate of the third stream of media samples.

In some embodiments, the code further comprises code to cause the processor to transmit the first synchronized media file to a remote compute device.

BRIEF DESCRIPTIONS OF THE DRAWINGS

DETAILED DESCRIPTION

Attempts to capture data/media streams from multiple devices, such as "smart classroom" devices, and combine them, for example into a livestream, can be complicated by the fact that each data stream has its own capture rate and/or its own associated timestamp, and thus may not be synchronized in time with one or more other concurrent data streams. Moreover, data/media streams can differ (e.g., in type, frame rate, capture rate, timestamp, etc.) among multiple smart classrooms, and may be activated and deactivated in difference smart classrooms at different times. Thus, a need exists for a purpose-built multimedia capture device that overcomes such shortcomings. Systems and methods of the present disclosure facilitate the combination of multiple data/media streams into a fully, or substantially fully, synchronized media file that can be transmitted (e.g., as a single file) to one or more remote compute devices. Embodiments of the present disclosure can improve the speed and efficiency of generating streamable media files.

As used in this specification, the singular forms "a," "an" and "the" include plural referents unless the context clearly dictates otherwise. Thus, for example, the term "an audio input port" is intended to mean a single audio input port or a combination of multiple audio input ports.

Figure 1:
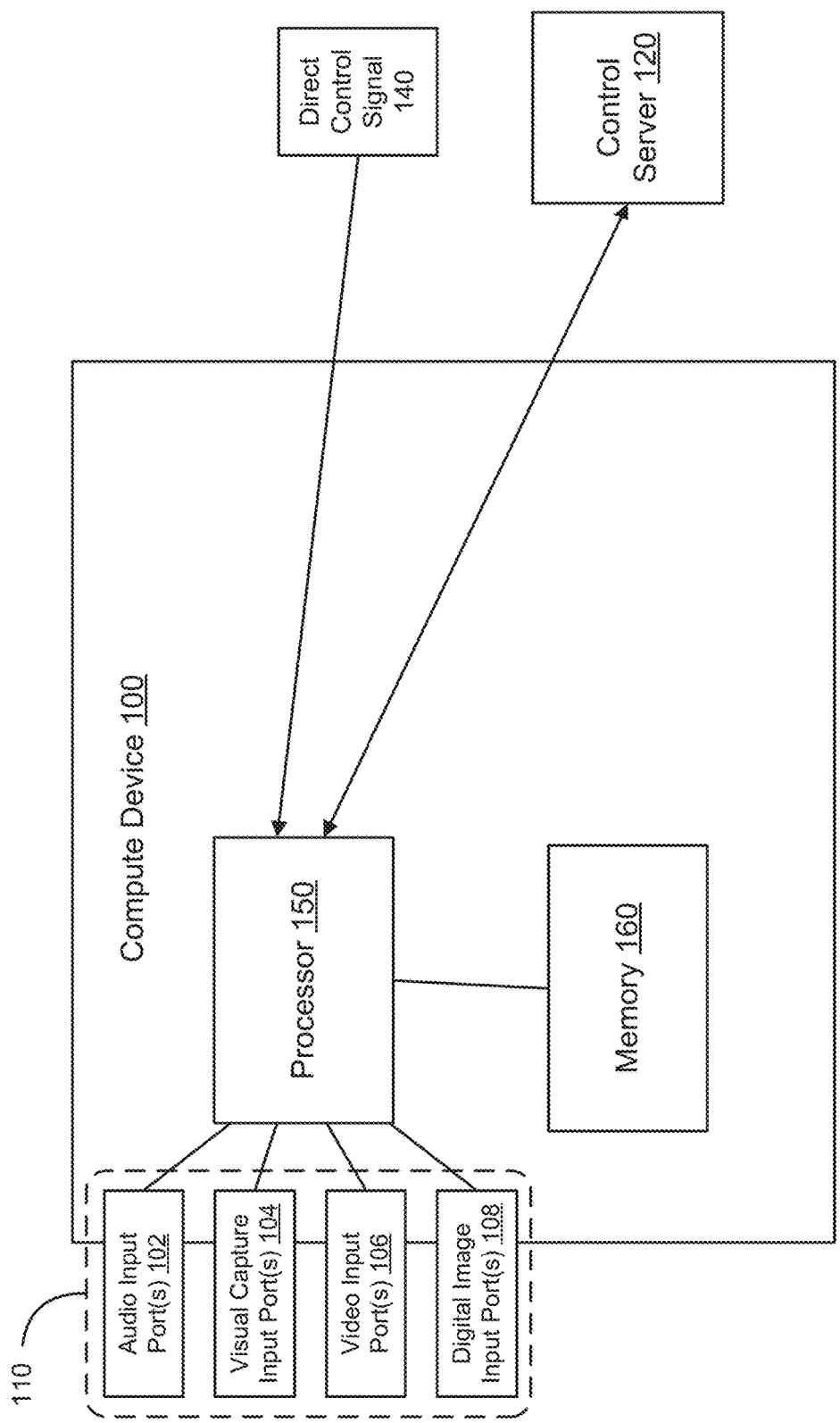
FIG. 1 is a system block diagram including a compute device, according to an embodiment.

FIG. 1 is a system block diagram that includes a compute device 100 with input ports 110, a processor 150, and a memory 160 operably coupled to the processor 150, according to an embodiment. During operation, the compute device 100 captures real-time media signals (e.g., including one or more media samples) from various electronic devices via at least a subset of the input ports 110, for example in response to start and stop indicators generated by a computer-implemented scheduler (not shown) in the compute device, in response to a scheduler in a control server 120 in wireless or wired communication with the processor 150, in response to detecting the real-time media signals at associated input ports, and/or from a direct control signal 140 received at the processor 150 from a user via a user interface (not shown) of the compute device 100. Compute device 100 receives, processes and/or modifies the media signals using processor 150. Said another way, the compute device 100 can receive a raw (or "native") media signal(s), and send and/or store a processed and/or modified media signal ("encoded media signal"). The compute device 100 can use the memory 160 to perform any of the above-described functions. For example, the memory 160 can store encoded media signals in the memory 160. The compute device 100 can capture and/or transmit encoded media signals to the control server 120, for example when prompted by a scheduler and/or by a user, or in response to detecting media signals at the input ports. The captured encoded media signals can be stored and/or sent to the control server 120 as, for example, a multiplexed signal over a network connection via an output port (not shown) of compute device 100.

The input ports 110 include an audio input port(s) 102, a visual-capture input port(s) 104, a video input port(s) 106, and a digital-image input port(s) 108. Each of the input ports 110 is integrated as part of the embedded environment of the compute device 100. The media signals captured by the input ports 110 can be received as analog signals and/or as digital signals. In some embodiments, one or more portions of the media signals are analog, and one or more portions of the media signals are digital.

The audio input port(s) 102 is used to capture an audio signal. The audio input port(s) 102 can include, for example, an RCA stereo audio input port(s), a ¼" jack stereo audio input port(s), XLR input port(s), balanced wire block, high definition multimedia (HDMI) input port(s), and/or a universal serial bus (USB) port(s). The audio signal can be produced by any type of device capable of producing an audio signal, for example, a stand-alone microphone or a microphone connected to a video camera. The compute device 100 can include more or fewer audio input ports, and/or can include more than one audio input port format, for example, one RCA audio input port and one wire block audio input port.

The visual-capture input port(s) 104 receives a digital or analog video-graphics-array (VGA) signal through, for example, a VGA input port(s), digital visual interface (DVI) input port(s), extended graphics array (XGA) input port(s), HD-15 input port(s), HDMI input port(s) and/or BNC connector port(s). The visual-capture input port 104 captures images produced by, for example, a computer or a microscope. An electronic device connected to the visual-capture input port 104 can also be used to capture images from, for example, an electronic whiteboard transmitting images via, for example, a VGA signal. The compute device 100 can include more or fewer visual-capture input ports, and/or can include more than one visual-capture input port format, for example, one VGA visual-capture input port and one DVI visual-capture input port.

The video input port(s) 106 receives motion video signals from devices such as video cameras via an input port(s) that includes, but is not limited to, an s-video input port(s), composite video input port(s), HDMI input port(s) and/or component video input port(s). The compute device 100 can include more or fewer video input ports, and/or can include more than one video input port format, for example, one HDMI video input port and one composite video input port.

The digital-image input port(s) 108 captures digital-images via an input port(s) such as an Ethernet port(s), a DVI port(s) and/or a USB port(s). The digital images can be acquired using, for example, a digital camera or a web camera. The embedded appliance 100 can include more or fewer digital-image input ports, and/or can include more than one digital image input port format, for example, one DVI digital-image input port and one USB digital image input port.

Compute device 100 includes hardware modules and/or software modules implemented in hardware, which can include, for example, application specific integrated circuits (ASICs), central processing units (CPUs), field programmable gate arrays (FPGA), modules, digital signal processors (DSPs), processors and/or co-processors, are configured to perform functions specifically related to capturing, processing, storing and/or sending media signals.

The control server 120 can be configured to be coupled to two or more compute devices 100, and each of the two or more compute devices 100 can have different capabilities. An embedded appliance capability can be, for example, a maximum native resolution supported by the input ports, the internal processing capability, and internal storage. The control server 120 can determine a session format in such a heterogeneous appliance environment by basing the determination of the session format on an individual embedded appliance capability in addition to the user-selected parameter for that appliance. For example, the selection of a given set of output parameters can result in a first session format for a first computer device 100, but the selection of the same set of output parameters can result in a second session format, different from the first session format, for a second computer device 100.

The computer device 100 captures any combination of real-time media signals received through the input ports 110. For example, a first stream of media samples received at a first input port of the input ports 110 can include a plurality of sequenced audio samples, a second stream of media samples received at a second input port of the input ports 110 can include a plurality of sequenced video frames, and a third stream of media samples received at a third input port of the input ports 110 can include a plurality of sequenced desktop frames.

Each of the media signals, although collected via different input ports 110, are acquired and synchronized by the computer device 100 as described below in connection with FIG. 2. For example, even though the sound of chalk against a classroom board can be received via a microphone through the audio input port 102, the motion of a professors hand wielding the chalk can be received synchronously using a video camera connected to the video input port 106. These media signals are synchronously received and processed by the computer device 100.

In some implementations, the media signals are synchronous serial communications, in that the data of each of the media signals is sent one bit at a time, in a continuous (or substantially continuous) stream at a constant (or substantially constant) rate.

The memory 160 can be any appropriate type of fixed and/or removable storage device. The memory can be, but is not limited to, a tape, digital-video-disk (DVD), digital-video-cassette (DVC), random-access-memory (RAM), solid-state drive (SSD), flash memory and/or hard disk drive. The size of the memory 160 can vary depending on the amount of storage needed for a particular application. For example, the size of the memory 160 can be higher if an embedded appliance 100 is intended to capture large quantities of media signals compressed in a lossless format. The size of the memory 160 can also be higher if a computer device 100 is intended to, for example, capture media signals over relatively long periods of time (e.g., during network down time) without uploading captured media signals to, for example, the control server 120. The memory 160 can be used to prevent the loss of captured media signals that cannot be sent to, for example, a control server because of a network outage. In some embodiments, the processor 150 can use the memory 160 to buffer information received via the input ports 110 before processing further.

FIG. 1 also illustrates that compute device 100 can be controlled using a direct control signal 140 from, for example, a user. The compute device 100 can include an interface such as a graphical user interface (GUI) (not shown), physical display (not shown) or buttons (not shown) to produce the direct control signal 140 to control some or all of the functions that can be performed by the compute device 100. The direct control signal 140 can be used to, for example, modify a schedule stored on the compute device 100, modify the processing of media signals, troubleshoot an error on the compute device 100 or control the compute device, for example, while the control server 120 is down. The direct control signal 140 can also be used to, for example, start and stop capturing and/or sending of media signals. The compute device 100 can be configured to require authentication (e.g., username/password) of, for example, a user before accepting a direct control signal 140 sent via an interface (not shown) from the user. The direct control signal 140 can also be generated using, for example, an interface (not shown) that is not directly coupled to the compute device 100. In some instances, the compute device can be directly controlled using the control server 120.

In some embodiments, the compute device 100 can include other software and/or hardware modules to perform other processing functions such as, for example, encoding, decoding, compression, decompression, scheduling, indexing, splitting, stabilization, synchronization and/or formatting of media signals. Further examples of such processing functions are described in U.S. Pat. No. 9,510,045, titled "Methods and Apparatus for an Embedded Appliance," and U.S. Pat. No. 9,071,746, titled "Embedded Appliance for Multimedia Capture," each of which is incorporated herein by reference.

Figure 2:
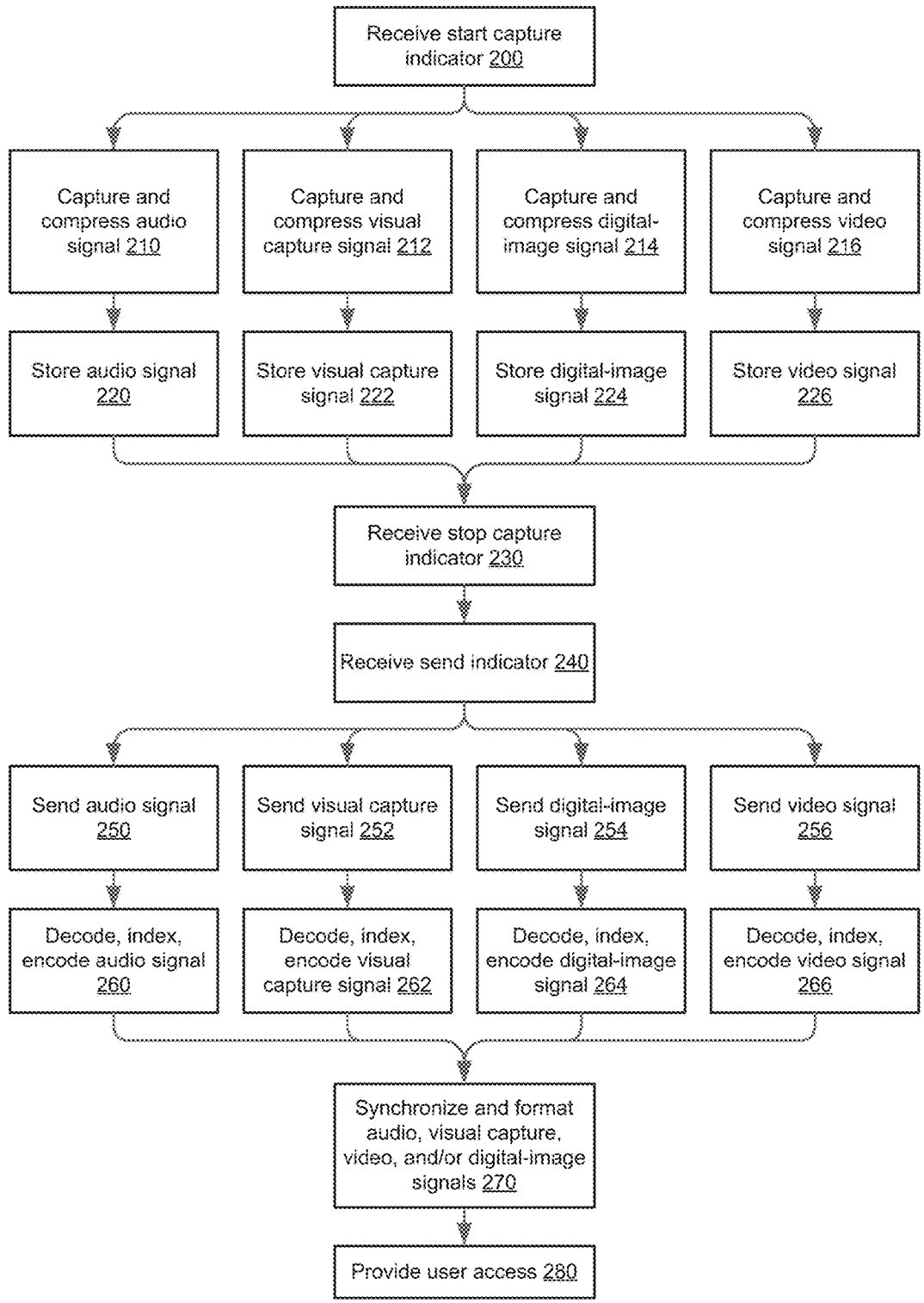
FIG. 2 is a flowchart that illustrates capturing, processing, storing and/or sending of media signals, according to an embodiment.

FIG. 2 is a flowchart that illustrates capturing, processing, storing and/or sending of media signals (e.g., using a compute device, such as compute device 100 in FIG. 1), according to an embodiment. The flowchart shows that the method begins with receiving a start capture indicator at 200. The start capture indicator indicates when the embedded appliance is to capture real-time media signals. The start capture indicator at 200 can include an instruction or rule to start capturing media signals immediately upon their creation, according to a schedule, or at a subsequent user-specified time. Alternatively or in addition, the start capture indicator at 200 can include an indication that the capture is to be of a subset of media signals, for example, only an audio signal and a visual-capture signal.

As shown in FIG. 2, media signals (e.g., including one or more media samples) are captured and compressed, at 210, 212, 214 and 216, in response to the start capture indicator. More specifically, an audio signal is captured and compressed at 210, a visual-capture signal is captured and compressed at 212, a digital-image signal is captured and compressed at 214, and a video signal is captured and compressed at 216. Although FIG. 2 shows the capturing, processing, etc. of each of these types of media signals separately, the rest of the discussion related to FIG. 2 will make reference only to the collective media signals rather than to each individual media signal. Also, although the flowchart shows all of the media signals, any combination (or subset) of the media signals can be captured, processed, stored and/or sent. For example, more than one audio signal and a single visual-capture signal can be captured, without capturing a digital-image signal or a video signal.

After the media signals have been captured and compressed at 210-216, the respective captured media signals are stored, at 220-226. In this embodiment, the media signals are stored locally, but in some embodiments, the media signals can be stored, for example, on a remotely-accessible database. The flowchart shows the capturing and compressing at 210-216 and storing at 220-226 of the media signals as discrete steps, but the media signals are continuously captured and compressed at 210-216 and continuously stored at 220-226 until a stop capture indicator is received, at 230. The stop indicator at 230 can include an instruction or rule to stop capturing, compressing and storing media signals.

The start capture indicator at 200 and the stop capture indicator at 230 can be generated by an embedded appliance, by a compute device (e.g., compute device 100 in FIG. 1), or by a control server, according to a schedule or according to defined criteria. In some embodiments, separate stop and start indicators can be sent to capture the different media signals. Although not shown in this flowchart, the capturing, compressing and storing of media signals can be paused and resumed at any time. The pausing can be prompted using a stop capture indicator and the resuming can be prompted by a start capture indicator generated by, for example, a control server, an embedded appliance, a compute device (e.g., compute device 100 in FIG. 1), or a user of a compute device via a user interface.

A send indicator is received at 240, the send indicator including an instruction or rule to send the stored media signals. The send indicator at 240 can be generated by an embedded appliance, by a compute device (e.g., compute device 100 in FIG. 1), or by a control server, for example according to a schedule. The send indicator at 240 can include an instruction or rule to send stored media signals immediately or at a later specified time. The send indicator at 240 can also include an instruction or rule to send only a portion of one or more stored media signals, for example, only a portion of a captured, compressed and stored digital-image signal.

The signals are sent, at 250-256, in response to the send indicator received at 240. The media signals are then decoded, processed for indexing and encoded at 260-266, and synchronized and formatted at 270. Any portion of the decoding, indexing and encoding at 260-266 and synchronizing and formatting at 270 can be performed at an embedded appliance, a compute device (e.g., compute device 100 in FIG. 1), or a control server. For example, indexing (e.g., scene detection) of a video signal can be performed before being sent, as a video signal, to, for example, a control server.

After the media signals have been synchronized and formatted at 270, the media signals are made available to a user for accessing 280. The media signals are synchronized according to the markings creating during the indexing at 260-266. The media signals can be formatted into one or more types of formats. The user can access the signals at, for example, a control server and/or a server(s) (e.g., server configured as a course management system) over a network connection from a personal computer using a username and password.

Figure 3:
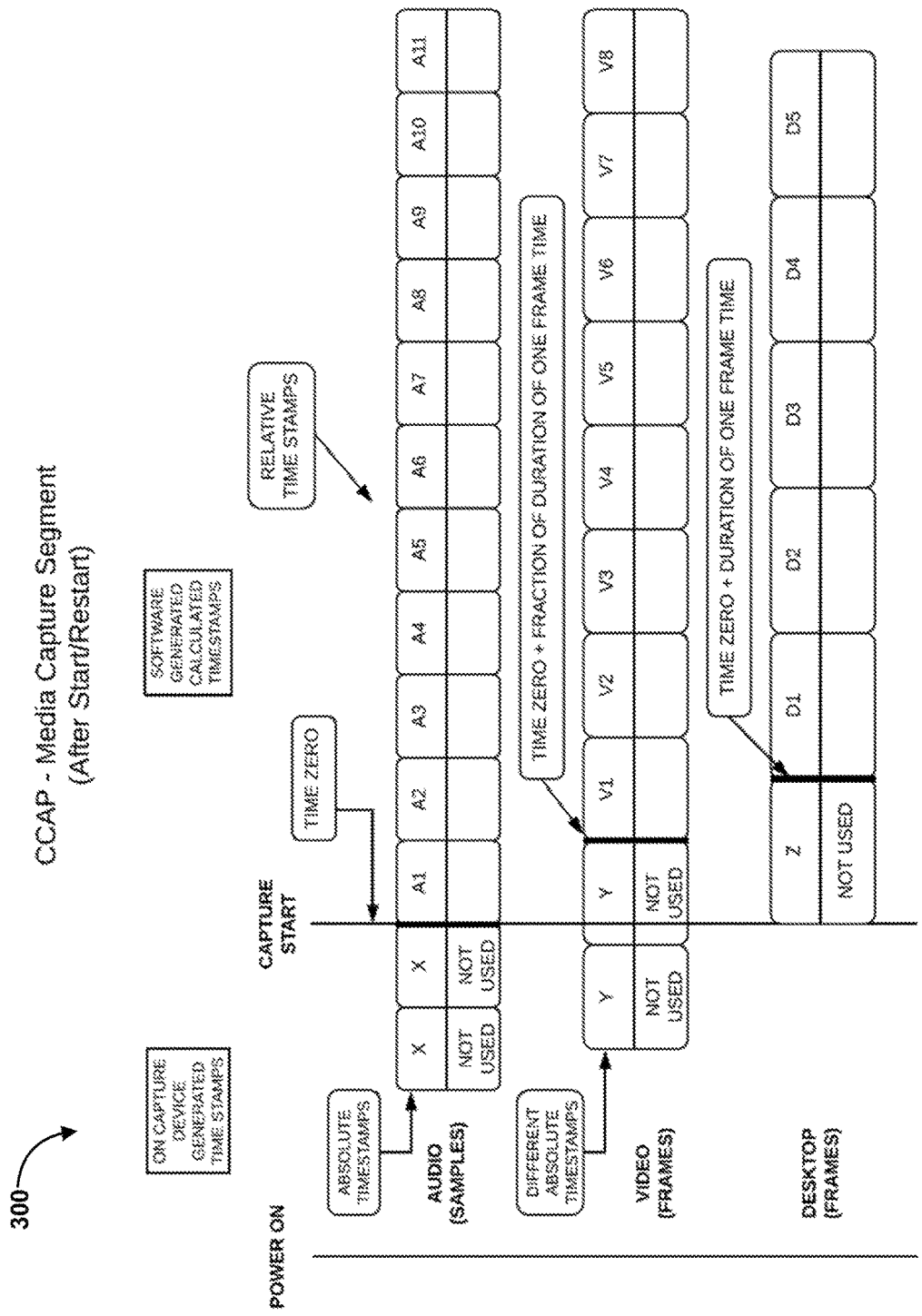
FIG. 3 is a timeline showing absolute and relative time stamps for multiple different captured media streams, according to an embodiment.

Example details of the capture process (e.g., at 210-216 of FIG. 2) are provided in FIG. 3, which includes a timeline showing the absolute and relative time stamps for different captured media streams, according to an embodiment. The process 300 illustrated by FIG. 3 can be performed, for example, by the compute device 100 discussed above in connection with FIG. 1. As shown in the example of FIG. 3, a compute device can be connected via its input ports to capture devices (not shown) that capture audio samples and video frames. The compute device can also start and record desktop frames. The process illustrated by FIG. 3 can be performed upon startup (e.g., when the capture devices are first powered on and the compute device first receives streamed samples from the capture devices). The process illustrated by FIG. 3 can be performed each time a capture device is restarted (e.g., upon restart), for example when a camera is unplugged from the compute device and then reconnected, when a camera device is initially attached to the compute device, when the resolution of a stream from a capture device is changed, when a capture device is switched out, etc. In instances where a single ("first") capture device is unplugged from the compute device during an n-stream capture, the compute device can continue to capture the remaining n–1 streams that are still arriving. Subsequently, when the "first" capture device is reattached to the compute device, or when a different capture device is attached to the compute device, an n-stream capture is resumed. This promotes reliable capture and recovery, independent of which capture devices are connected to the compute device, switched out from the compute device, or changed in terms of their characteristics.

At the beginning of the process 300, the compute device waits until at least one media sample (e.g., a frame or an audio sample) is detected, partially received, or fully received from every capture device (e.g., camera, microphone) that is participating in the capture restart (or initial startup). In some implementations, a media sample includes a sequence of bits. Generally speaking, in some implementations, the recording starts with the capture device having the highest sampling rate/frame rate with respect to the other capture devices. For example, in one implementation, if audio is used in the recording, then the recording starts with the audio sample. In this implementation, the audio sample in the recording will have zero relative timestamp. Other media streams from the other capture devices will have samples following this zero sample time, in a timeline. In other words, as shown in FIG. 3, the samples before recording have an absolute time stamp provided, for example, by the respective capture devices. Once recording begins, each sample has a relative time stamp provided (calculated, or determined) by the compute device.

After a sample of a first media stream is recorded (e.g., a sample of the audio stream) by the compute device, the relative offsets of timestamps of the samples of each subsequently received media stream are calculated by the compute device based on hardware timestamps (e.g., as acquired by the associated capture device, such as a camera/microphone) individually per each capture device. The capture devices provide absolute time data, but the absolute time often differs among the capture devices. The individual time offsets for the samples of each of the different media streams, as well as the differences between those individual time offsets, are preserved (e.g., stored) by the compute device, for example in memory. For example, a processor of the compute device can be configured to store, in a memory, a representation of one or more relative offset times.

Following the example shown in FIG. 3, the first video frame is captured by the compute device after the first audio sample is captured by the compute device, and starts "within" a single video frame duration after the first captured audio sample commences. In other words, after the first audio sample is recorded, the next full video frame is captured/recorded and assigned a relative time stamp that is calculated by adding the start time of the first captured audio sample (labeled as "time zero," also referred to as a "capture start" time) with a duration corresponding to the fraction of one video frame that coincides with the first captured audio sample (i.e., the amount of time, or "offset time," or "offset" between the audio sample zero time and the start of the next full video frame, which is the first captured video frame). This offset is calculated by the compute device and is preserved through the assignment of the relative time stamp to the first captured video frame (e.g., by storing, in memory, an indication of an association between the first captured video frame and the associated offset).

In the example of FIG. 3, the first desktop frame joins the timeline last (i.e., after the first audio sample and the first video frame) because its frame rate is the lowest (i.e., the desktop frame rate is lower than the audio stream sampling rate and the video stream frame rate included in the example of FIG. 3). In other words, after the first video frame is captured/recorded, the next desktop frame received at the compute device is recorded and assigned a relative time stamp that indicates the start time of the first captured audio sample ("time zero," as discussed above) plus the duration of one desktop frame (or a fraction thereof). The first captured desktop frame of FIG. 3 is assigned a timestamp exactly one frame duration from time zero. In alternative implementations, the desktop frame can be started sooner. But, starting the desktop frame exactly one frame duration from time zero is predictable. Also starting of desktop capture this way does not affect sync between the audio stream and video stream.

In yet another alternative implementation, audio is not present in the recording, and the "zero"-based timeline of the start of recording (i.e., time zero) is moved to (or considered relative to) a first camera frame or a first video frame. In other words, if an audio stream is not being captured (e.g., because there is no separate microphone or other audio capture device detected or specified to be captured from), the recording and synchronization process starts with the capture device among the remaining capture devices having the highest frame rate.

The process set forth above can accommodate—"restarts" of capture processes associated with individual streams (e.g., of audio samples, video frames, or desktop frames), dual streams with audio present (e.g., a combination of audio and video, or a combination of audio and desktop), dual streams without audio (e.g., a combination of video and desktop, or a combination of video and video), and/or triple streams (e.g., a combination of audio, video and display, or a combination of audio, video, and video). Moreover, processes of the present disclosure can accommodate each of the foregoing types of capture restart in response to and/or in combination with one or more pauses in one or more of the segments/streams, such that the relative timestamp calculation(s) are modified by the compute device in response to and/or based on the pauses. Multiple pauses can occur separately (e.g., at different points in time and/or in one or more different streams) or substantially concurrently in each of the streams (or a subset thereof).

Once the recording and relative time stamps have been calculated, the various streams can be combined to produce livestreaming of the synchronized streams where timestamps for the live stream are not adjusted. If not livestreamed but instead provided to local video on demand (VOD) in a dual encoders setup, the timestamps can be adjusted.

Figure 4:
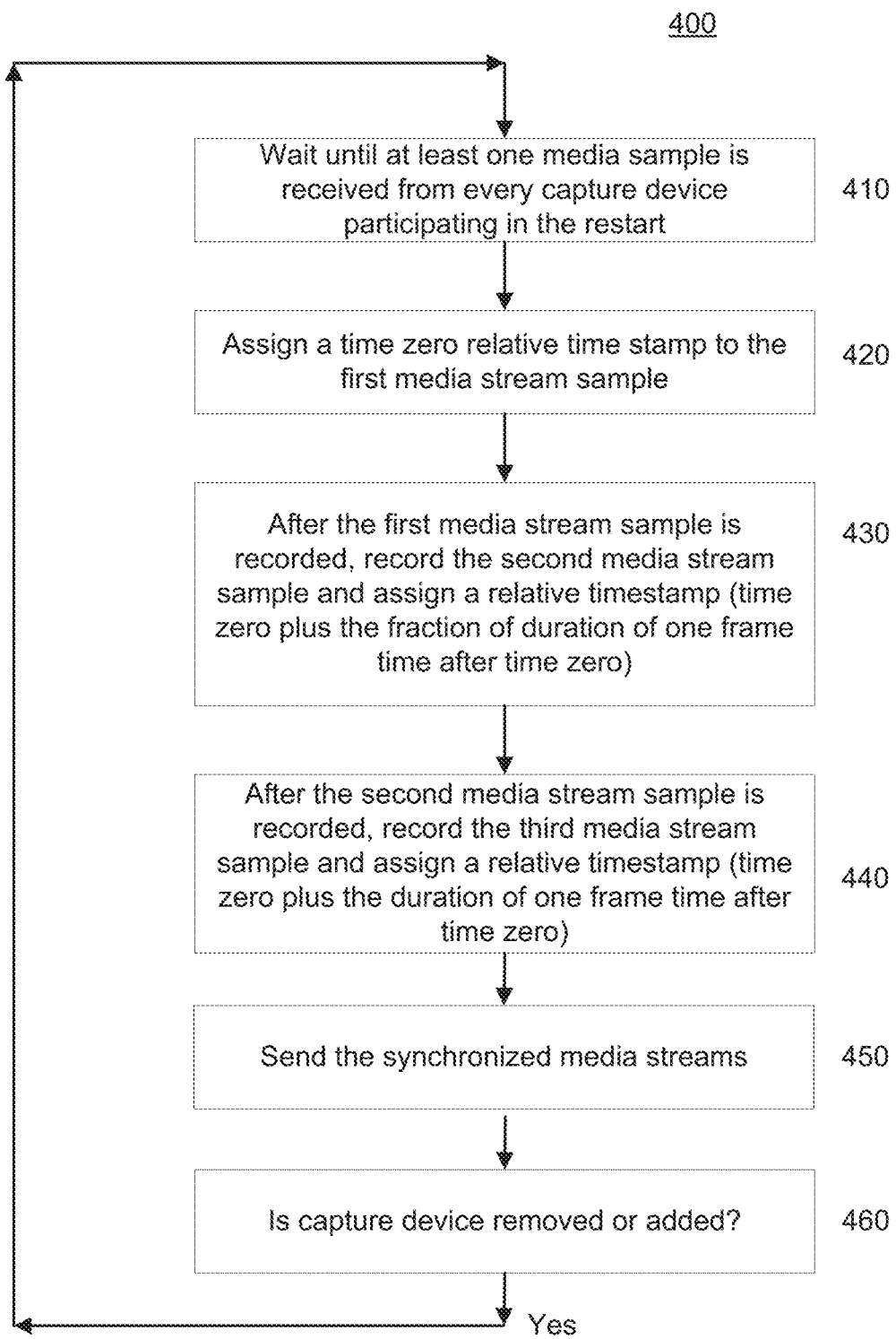
FIG. 4 is a process flow chart showing a synchronization process compatible with the timeline of FIG. 3.

FIG. 4 provides a flowchart of a synchronization process 300, compatible with the timeline of FIG. 3. As shown in FIG. 4, the synchronization process 400 begins with a stand-by/waiting period, at 410, terminating when at least one media sample is received from every capture device participating in the restart. At 420, a time-zero relative timestamp is assigned to the first media stream sample. After the first media stream sample is recorded, the second media stream sample is recorded (at 430) and assigned a relative timestamp, for example calculated as the time zero value plus the fraction of duration of one frame time (of the second media stream) after time zero. At 440, after the second media stream sample is recorded, the third media stream sample is recorded and assigned a relative timestamp, for example calculated as the time zero value plus the duration (or fraction thereof) of one frame time (of the third media stream) after time zero. At 450, the synchronized media streams are sent (e.g., transmitted to a remote compute device). A determination is then made, at 460, as to whether one or more capture devices have been removed or added (460) (i.e., a signal associated with the one or more capture devices is no longer detected at an input of the compute device to which the one or more capture devices are coupled), for example in response to a detection thereof. If, at 460, one or more capture devices have been removed or added, the synchronization process 300 continues with a "restart" (e.g., by returning to step 410, as shown in FIG. 4), in which the system enters stand-by/waiting mode until at least one media sample is received from every now participating capture device. If, at 460, no capture devices have been removed or added, the synchronization process 300 is complete, and can continue to monitor for the removal or addition of capture devices from/to the compute device.

Figure 5:
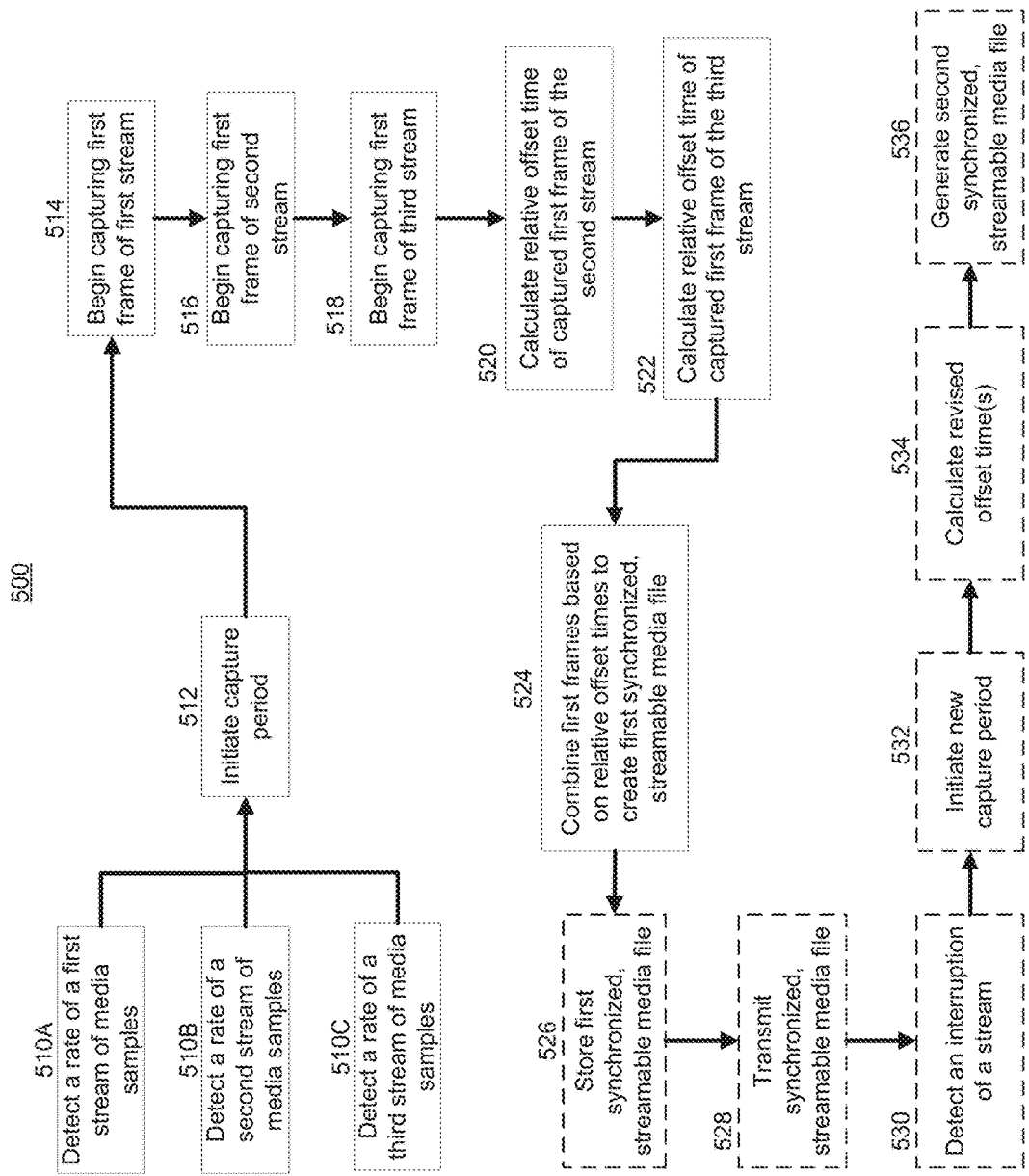
FIG. 5 is a process flow chart showing a further synchronization process compatible with the timeline of FIG. 3.

FIG. 5 is a process flow chart showing a further synchronization process, compatible with the timeline of FIG. 3. As shown in FIG. 5, the synchronization process 500 begins with detection, at a first input port of a processor, of a rate of a first stream of media samples (510A), detection, at a second input port of the processor, of a rate of a second stream of media samples (510B), and detection, at a third input port of the processor, of a rate of a third stream of media samples. At 512, a capture period is initiated, the capture period having a capture start time based on the first stream of media samples. The capture period includes capturing, beginning at the capture start time, a first frame of the first stream of media samples (514). The selection of the first stream of media samples as the first stream from which to capture a frame can be based on the rate of the first stream of media samples being higher than the rate of the second stream of media samples and the rate of the third stream of media samples. The capture period also includes capturing, beginning at a first time subsequent to the capture start time, a first frame of the second stream of media samples (516). The selection of the second stream of media samples as the second stream from which to capture a frame can be based on based on the rate of the second stream of media samples being higher than the rate of the third stream of media samples. The capture period also includes capturing, beginning at a second time subsequent to the first time, a first frame of the third stream of media samples. The synchronization process 500 continues with calculating, at 520, a relative offset time (e.g., relative to the capture start time) of the captured first frame of the second stream of media samples, and calculating, at 522, a relative offset time of the captured first frame of the third stream of media samples. At 524, the captured first frame of the first stream of media samples, the captured first frame of the second stream of media samples, and the captured first frame of the third stream of media samples are combined based on the relative offset time of the captured first frame of the second stream of media samples and the relative offset time of the captured first frame of the third stream of media samples, to form a first synchronized, streamable media file. The first synchronized, streamable media file is optionally stored at 526 and/or transmitted (e.g., to a remote compute device) at 528.

In some embodiments, the synchronization process 500 continues with a detection, at 530, of an interruption (e.g., a pause, outage, signal fluctuation, etc.) of one or more of the streams of media samples. For example, an interruption of the second stream of media samples may be detected. In such an instance, and in response to detecting the interruption, a new capture period can be initiated (532) (also referred to herein as a "restart"), during which a second captured portion of the first stream of media samples and a second captured portion of the third stream of media samples can be captured. In addition, and also in response to detecting the interruption, a revised relative offset time (e.g., relative to a new capture start time associated with the restarted capture period) for the third stream of media samples can be calculated (534), and a second synchronized, streamable media file can be generated based on the revised relative offset time.

In some embodiments, media signals of the present disclosure are received by one or more embedded appliances for multimedia capture (also referred to herein as "embedded appliances"), which are devices dedicated to capturing, processing, storing and/or sending real-time media signals (e.g. audio signal, video signal, visual-capture signal, digital-image signal). An embedded appliance can capture real-time media signal(s) that can include digital-image signals, visual-capture signals, audio signals and/or video signals of, for example, an in-progress classroom presentation. After the media signal(s) have been captured, the embedded appliance can process the signal(s) by, for example, compressing, indexing, encoding, decoding, synchronizing and/or formatting the content. Embedded appliances can be, for example, distributed throughout a network and coordinated according to a schedule to capture, process, store and send the real-time media signals for eventual retrieval by a user from, for example, a control server and/or a server(s) configured as, for example, a course management system. Media streams being captured on the embedded appliance optionally can also be monitored and/or further processed by a control server before distribution.

As a dedicated (i.e., specific-purpose) device having an embedded environment, an embedded appliance uses a hardened operating system (OS) and a processor (e.g., processor system) to capture, process, store and/or send real-time media signals. The hardened OS is configured to resist security attacks (e.g., prevent access by an unauthorized user or program) and facilitate functions related only to the capturing, processing, storing and/or sending of real-time media signals. In other words, the hardware and software within the embedded appliance are integrated into and designed specifically for capturing, processing, storing and/or sending real-time media signals. Because the hardware and software for capturing, processing, storing and/or sending real-time media signals are integrated into the embedded environment of the embedded appliance, the costs and complexity associated with installation, scaling, design, deployment and technical support can be lower than that for a general purpose system.

A real-time media signal represents an image and/or a sound of an event that is being acquired by a sensor at substantially the same time as the event is occurring and that is transmitted without a perceivable delay between the sensor when acquired and an embedded appliance. The capturing, processing, storing and/or sending of the real-time media signals by the embedded appliance can be performed at any time. Real-time media signals are also referred to herein as media signals.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

In conclusion, among other things, an apparatus and method for synchronizing media signals using a compute device are described. While various embodiments have been described above, it should be understood that they have been presented by way of example only and various changes in form and details may be made. For example, processors and/or modules of a compute device can included on separate electronic boards in one or more housings, can have dedicated memory (RAM etc.).

The invention claimed is:

1. An apparatus, comprising:
   a processor having a first input port and a second input port; and
   a memory operably coupled to the processor,
   the processor configured to:
      detect, at the first input port, a first stream of media samples;
      detect, at the second input port, a second stream of media samples;
      determine, in response to the detection of the first stream of media samples and the second stream of media samples, a capture start time associated with the first stream of media samples;
      capture, beginning at the capture start time, a first frame of the first stream of media samples;
      capture, beginning at a first time subsequent to the capture start time, a first frame of the second stream of media samples;
      calculate a relative offset time based on the capture start time, the first time, and a rate associated with the second stream of media samples;
      store, in the memory, an indication of an association between the captured first frame of the second stream of media samples and the relative offset time;
      combine the captured first frame of the first stream of media samples and the captured first frame of the second stream of media samples, based on the relative offset time, to form a synchronized media file; and
      transmit the synchronized media file to a remote compute device.

2. The apparatus of claim 1, wherein the processor is further configured to receive an indication of the capture start time from a control server in operable communication with the processor.

3. The apparatus of claim 1, wherein the processor is further configured to receive an indication of the capture start time from a local scheduler.

4. The apparatus of claim 1, wherein the relative offset time is a first relative offset time, the processor further configured to:
   detect, at a third input port of the processor, a third stream of media samples;
   capture, beginning at a second time subsequent to the first time, a first frame of the third stream of media samples;
   calculate a second relative offset time based on the capture start time, the second time, and a rate associated with the third stream of media samples; and
   store, in the memory, an indication of an association between the captured first frame of the third stream of media samples and the second relative offset time.

5. The apparatus of claim 4, wherein the processor is further configured to form the synchronized media file by combining the captured first frame of the third stream of media samples with the captured first frame of the first stream of media samples and the captured first frame of the second stream of media samples.

6. The apparatus of claim 1, wherein the processor is further configured to:
   capture a plurality of additional frames of the first stream of media samples;
   capture a plurality of additional frames of the second stream of media samples; and
   form the synchronized media file by combining the plurality of additional frames of the first stream of media samples and the plurality of additional frames of the second stream of media samples with the captured first frame of the first stream of media samples and the captured first frame of the second stream of media samples, based on the relative offset time.

7. The apparatus of claim 1, wherein the processor is further configured to identify the first time based on a hardware timestamp encoded by the second stream of media samples.

8. A method, comprising:
   detecting, at a first input port of a processor, a rate of a first stream of media samples;
   detecting, at a second input port of the processor, a rate of a second stream of media samples;

detecting, at a third input port of the processor, a rate of a third stream of media samples;
initiating a capture period having a capture start time based on the first stream of media samples;
during the capture period:
  capturing, beginning at the capture start time, a first frame of the first stream of media samples, based on the rate of the first stream of media samples being higher than the rate of the second stream of media samples and the rate of the third stream of media samples;
  capturing, beginning at a first time subsequent to the capture start time, a first frame of the second stream of media samples, based on the rate of the second stream of media samples being higher than the rate of the third stream of media samples;
  capturing, beginning at a second time subsequent to the first time, a first frame of the third stream of media samples;
  calculating a relative offset time of the captured first frame of the second stream of media samples; and
  calculating a relative offset time of the captured first frame of the third stream of media samples,
and
combining the captured first frame of the first stream of media samples, the captured first frame of the second stream of media samples, and the captured first frame of the third stream of media samples, based on the relative offset time of the captured first frame of the second stream of media samples and the relative offset time of the captured first frame of the third stream of media samples, to form a synchronized, streamable media file.

9. The method of claim 8, wherein the first stream of media samples includes a plurality of sequenced audio samples, the second stream of media samples includes a plurality of sequenced video frames, and the third stream of media samples includes a plurality of sequenced desktop frames.

10. The method of claim 8, wherein the synchronized, streamable media file is a first synchronized, streamable media file, the method further comprising:
  detecting a fourth stream of media samples received at the processor via a fourth input port;
  capturing the fourth stream of media samples; and
  generating a second synchronized, streamable media file that includes the fourth stream of media samples.

11. The method of claim 8, wherein the initiating the capture period is in response to a communication received from a local scheduler.

12. The method of claim 8, wherein the initiating the capture period is in response to a communication received from a control server.

13. The method of claim 8, further comprising storing, in the memory:
  an indication of an association between the captured first frame of the second stream of media samples and the relative offset time of the captured first frame of the second stream of media samples; and
  an indication of an association between the captured first frame of the third stream of media samples and the relative offset time of the captured first frame of the third stream of media samples.

14. A non-transitory processor-readable medium storing code representing instructions to be executed by a processor, the code comprising code to cause the processor to:
  combine a first captured portion of a first stream of media samples, a first captured portion of a second stream of media samples, and a first captured portion of a third stream of media samples, based on (1) a first relative offset time associated with the second stream of media samples, and (2) a second relative offset time associated with the third stream of media samples, to form a first synchronized, streamable media file;
  detect an interruption of the second stream of media samples;
  capture, in response to detecting the interruption, a second captured portion of the first stream of media samples, and a second captured portion of the third stream of media samples;
  calculate, in response to detecting the interruption, a revised relative offset time for the third stream of media samples;
  generate a second synchronized, streamable media file based on the revised relative offset time;
  detect a fourth stream of media samples received at the processor;
  capture the fourth stream of media samples; and
  generate a third synchronized, streamable media file that includes the fourth stream of media samples.

15. The non-transitory processor-readable medium of claim 14, wherein the code further comprises code to cause the processor to:
  receive an instruction to initiate a capture period;
  capture, in response to the instruction and beginning at a capture start time, the first captured portion of the first stream of media samples via a first input port of the processor;
  capture, beginning at a first time subsequent to the capture start time, the first captured portion of the second stream of media samples via a second input port of the processor;
  capture, beginning at a second time subsequent to the first time, the first captured portion of the third stream of media samples via a third input port of the processor;
  calculate, via the processor, the first relative offset time and the second relative offset time; and
  store, in a memory, a representation of the first relative offset time and a representation of the second relative offset time.

16. The non-transitory processor-readable medium of claim 15, wherein the instruction to initiate a capture period is received from one of a local scheduler or a control server.

17. The non-transitory processor-readable medium of claim 14, wherein a frame rate of the first stream of media samples is higher than a frame rate of the second stream of media samples, and the frame rate of the second stream of media samples is higher than a frame rate of the third stream of media samples.

18. The non-transitory processor-readable medium of claim 14, wherein the code further comprises code to cause the processor to transmit the first synchronized media file to a remote compute device.

* * * * *